March 17, 1931.  T. F. BARRY ET AL  1,797,117
SAW AND KEY
Original Filed May 31, 1929
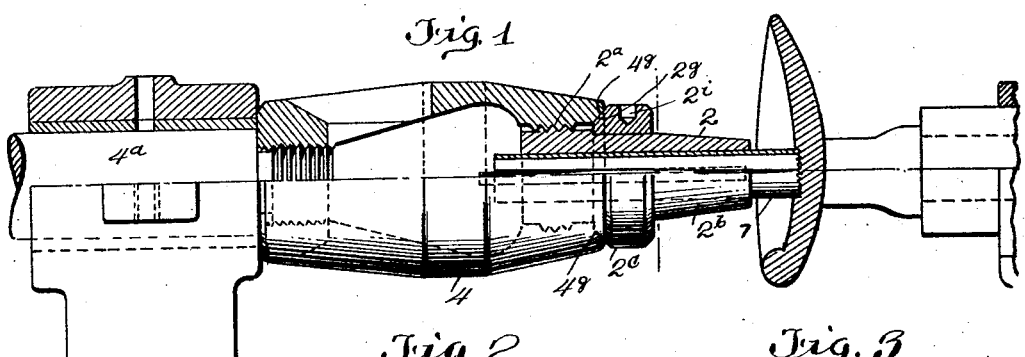
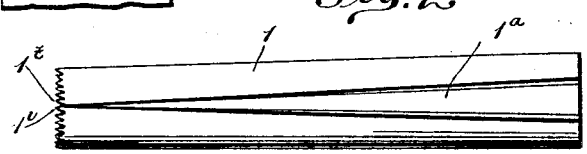
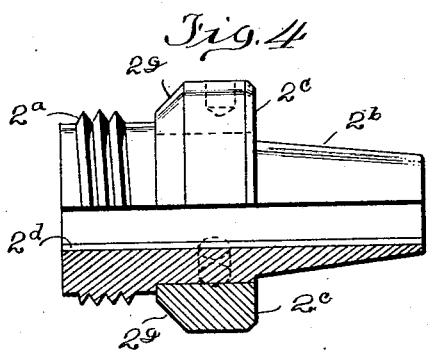
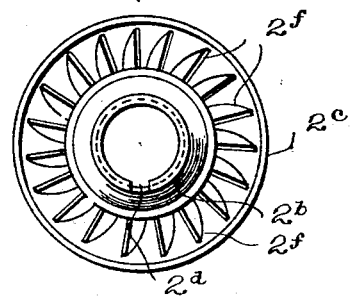
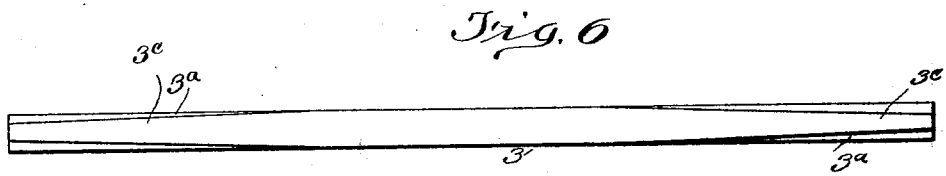
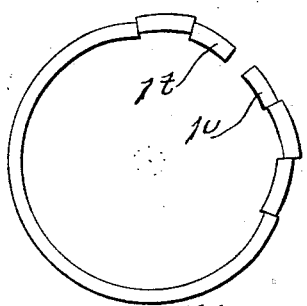
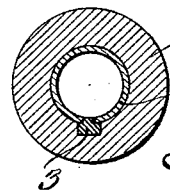
INVENTORS
Thomas F. Barry
Leonard Black
BY Alexander Sowell
ATTORNEYS Patented Mar. 17, 1931

1,797,117

UNITED STATES PATENT OFFICE

THOMAS F. BARRY AND LEONARD BOWEN, OF MUSCATINE, IOWA

SAW AND KEY

Original application filed May 31, 1929, Serial No. 367,436. Divided and this application filed August 20, 1929. Serial No. 387,195.

This invention provides a novel tubular saw, for use in cutting button blanks from shells and the like; a collet for positioning and holding such saw in proper shape and condition for use; and means for securing the saw in the collet. This application is a division of our application filed May 31, 1929, Serial No. 367,436.

In the manufacture of so-called pearl buttons the button blanks are cut from the shells by means of tubular saws. In order that our invention may be clearly understood it should be noted that at present there are in common use two types of saws, to wit, a solid tubular saw, and a split tubular saw made of sheet steel bent into tubular form. The solid tubular saw is made by boring out a cylindric piece of high speed steel, reaming the bore to a certain size, and turning the saw to a certain exterior diameter. To properly harden and temper such saw it must be heated within a narrow temperature range, and to a lower degree, than is generally used for tools made from high speed steel; for if hardened only slightly too hard it is not first class, and if hardened at slightly too low a heat its efficiency will be lowered accordingly. After hardening, the saw is softened (from the file hard condition obtained by correct hardening by tempering) to a point where the teeth can be filed, and then burred, upset or swaged, to provide clearance in cutting.

Saws made from high speed steel are not ductile after heat treatment and therefore their teeth (even though soft enough to be easily filed) cannot be set to provide the required clearance; but if properly treated and tempered soft enough, can be burred. If the initial hardening was effected at say a heat of only 20° F., too high, then the burr developed or put on when using will be brittle, and after a few buttons have been cut the saw will no longer have the necessary inside and outside clearance; and this fault cannot be corrected by tempering. Also if the initial hardening was effected at a heat say only 20° too low, which frequently happens, the saw will be too soft and the burr will quickly wear off and the saw lack clearance.

The solid tube saws must be bored inside and ground outside to a definite size, which involves a large waste of steel, and makes them expensive to manufacture and to heat treat. The average selling price of such saws is about 80 cents each. Because of their necessary softness such solid tubular saws dull rapidly, which necessitates frequent refiling and burring thereof, and thus lessens the number of blanks that can be cut therewith in a given time, and correspondingly lessens the operator's earnings.

The split saws heretofore used for cutting pearl buttons are commonly made from carbon sheet steel bent into tubular form and must be tempered so soft that they can be filed and set by the user. Such split tubular saws are tempered about as hard as an ordinary wood cutting hand saw. The average selling price of such saws is about 10 cents each. These split steel saws while low in price are costly to use because they require such frequent sharpening and setting that the consequent loss of time for such operations and the wear on files lessens the operator's earnings.

If a saw made from high speed steel is tempered soft enough to permit setting the teeth its hardness is reduced to such an extent that very little if any cutting can be done. To illustrate, if a button saw is made from tungsten hack saw steel (such hack saw teeth being set before the saw is hardened and when properly heat treated will saw iron and steel), and after hardening is softened to a degree that will permit the setting of the teeth for clearance, the teeth will be so soft that they will only cut about four blanks at a sharpening. A saw made from high speed steel or other alloyed steels would act similarly to the hack saw steel just described.

Many steels, other than the varieties above mentioned, have been tried for button cutting saws and many efforts have been made for years to produce better saws; but up to the present invention no one has been able to produce a saw superior to or more efficient than the solid tubular high speed steel saws and the tubular sheet steel saws hereinbefore described.

By our present invention we provide a novel tubular saw made from a special high speed sheet steel the teeth of which can be quickly heated, set while heated, and will be file hard when cool. Our novel saw is free from the defects of and overcomes the objections to, the solid tubular saws and split tubular saws heretofore referred to, and can be easily set and sharpened as hereinafter explained, and is greatly superior in cutting qualities and durability. Our invention also provides means for holding the saw in shape while in use.

In the accompanying drawings we have shown one practical embodiment of the invention and will describe the same with reference thereto, and summarize in the claims the essential features of the invention and the novel features of construction and novel combinations of parts for which protection is desired.

In said drawings:

Fig. 1 is a part side elevation and part sectional view of part of a simple button sawing machine equipped with our improved saw and collet.

Fig. 2 is a side view and Fig. 3 an end view of the saw.

Fig. 4 is a part side and part sectional view of the collet and Fig. 5 is an end view of such collet.

Fig. 6 is an enlarged detail view of the key.

Fig. 7 is an enlarged transverse section of the collet and saw.

Fig. 8 is a detail view of the toothed end of the saw.

The saw 1 is made from special analysis high speed steel, which when in sheet form and heated to a red heat can be readily shaped. A suitable piece of such steel is heated and bent into tubular form slightly tapered to leave a V tapered opening 1a (Figs. 2 and 3) between the meeting edges of the split. The smaller end of the saw is the cutting end, and the larger end thereof is the discharge end, the taper permitting the cut blanks to readily pass through the saw.

Such saw is secured in a suitable holder or collet 2 and its teeth subjected to the action of an electric current of sufficient intensity to heat the teeth to the correct hardening heat at which temperature the teeth are soft; the saw teeth are then disengaged from the heating device and immediately engaged with a setting die by which the hot teeth are accurately "set"; then the saw is withdrawn from the setting die, and the teeth quickly cool in the air, and in so doing become file hard and are ready for use.

The teeth can be heated and set by the method and apparatus described in our companion application, tubular saw heating and setting machine, filed May 31, 1929, Serial No. 367,434. The teeth can be easily heated by this apparatus to the correct temperature for hardening high speed steel, and can be readily set thereby while heated, and when the teeth cool and are no longer visibly red they will be file hard. The saws so made and treated are exceedingly durable because of the special steel used; the short heating cycle; the relatively slow air cooling; and the hardness of teeth.

The collet 2 has an internal tapered bore corresponding to the exterior diameter of the saw 1, and a longitudinal keyway 2d with which keyway the slot 1a in the saw should register. The collet, see Figs. 1 and 4, has an externally threaded portion 2a at one end, an intermediate central portion of slightly less diameter than the threaded portion 2a, and a reduced tapered portion 2b at the other end. The collet has an annular flange or collar 2c on its exterior intermediate the parts 2a and 2b. This collar might be made integral with the body of the collet as described in the application of Thomas F. Barry filed December 4th, 1926, Serial No. 152,648. This collar is provided in one face with radial notches 2f for engagement with an indexing pawl as described in our companion application for button saw tooth grinding machine filed May 31, 1929, Serial No. 367,435. The collar 2c is provided with a beveled surface 2g on its inner end which is adapted to engage an opposed beveled surface 4g in the end of the head 4 of a spindle 4a of any suitable machine to which the saw is to be attached, an ordinary button cutting machine being indicated in the drawing. The threads 2a of the collet are coarse and slightly smaller than the internal threads in the head 4 with which the threads 2a in the collet engage with a loose fit, so that when the collet is screwed into the head the beveled surface 2g of the collar engaging the beveled surface 4g of the head will accurately center the collet and saw in the head, the loose fit of the threads permitting this. Heretofore split tubular saws have been fitted into tapered bores in a collet and a tapered key entered in the slot in the saw. The performance of a saw in cutting pearl buttons is greatly dependent upon the accuracy and care used in mounting the saw in the collet, which operation determines whether the saw will run true or wobble, and therefore produce more or less perfect blanks. Heretofore after the saw is inserted in a collet, a key and a pin (having the same taper as the slot in the saw) was placed in the saw and the key pinched against the pin by holding in a vise, and the collet driven down until tight on the saw. Then the collet and saw was driven into a tapered hole in the chuck head of the button cutting lathe. Then the assembly was revolved to enable the operator to determine if the saw was properly aligned. If not the machine was stopped and the collet tapped with a hammer to align the saw, and this procedure was repeated until the saw seemed to run true. Such pounding on the collet batters it and bulges in the bore under the flange, and frequently makes it necessary to re-ream the bore—and this frequently causes same to be out of center.

To obviate all the above numerous difficulties, we provide the collet with an internal longitudinal keyway or groove 2d in which is inserted a slidable key 3. The keyway is broached in the improved collet in line with the face of some one notch 2f in the collar to assure the cutting of full size teeth at each side of the split in the saw when grinding the teeth. The key way is broached in definite relationship to the notches which of course determine the position and number of teeth and the face of one tooth is always on one edge of the saw at the split. The key 3 has a base portion that fits the groove in the collet and a projecting rib 3a the sides of which are tapered to fit or engage the tapered opening 1a in the saw.

The rib 3a is preferably tapered at each end for about 1¼ inches as at 3c (Fig. 6). This short taper is sufficient to insure a close fit within the tapered split opening in the saw, (which might not be the case were the taper to extend the full length of the key) and such short taper insures a complete rounding up of the toothed end of the saw, which projects out of the collet.

With the improved collet it is not necessary to file out the saw and it is not necessary to file the improved key. All that is necessary to mount the improved saw in the improved collet is to insert the saw into the collet from the rear or large end of the bore with the tapered split in the saw approximately in line with the straight groove 2d in the collet. Then insert the key 3 into the groove 2d so the first entered tapered end of rib 3a engages the tapered opening in the saw. The key as it enters brings the tapered split in the saw in line with the groove, and when pressed in wedges the tapered saw outwardly against the bore in the collet and holds the saw firmly therein.

The different widths of the tapered portions 3c of the key rib enables one key to be used with saws having splits slightly differing in width, which differences are caused by slight unavoidable variations in the thickness of the hot rolled tool steel used for the saws.

After the saw is assembled in the improved collet, the collet is placed in a button saw tooth grinder (see companion case, Serial No. 367,435) and the proper number of the teeth are ground in the saw.

In operation the saw runs in a counter clockwise direction and we have found that the outwardly set teeth in a split tubular saw are under greater strain, and the two most severely stressed teeth are those adjacent the split. The trailing tooth at the split in the saw tends to spread out and cut a larger groove, and such tendency is aggravated if such tooth is set out, and is minimized if such tooth is set in. Therefore we make the teeth 1t, 1v, Fig. 2, at each side of the split in the saw both full teeth and set both inwardly whereby they are relieved of considerable strain, and breakage of such teeth is practically eliminated, and the saw will run more truly than if such teeth are set alternately in and out.

After the teeth have been ground on the saw the collet holding the saw is removed from the saw tooth grinding machine and placed in the hardening and setting machine (see companion case, Serial No. 367,435). After hardening, the collet holding the saw is again placed in the chuck of the grinding machine and the teeth repointed. The collet and saw are then placed in the button cutting machine and are ready for cutting buttons. We do not herein claim the collet as that is claimed in companion original case Serial No. 367,436.

We claim:

1. A tubular split saw having the teeth at opposite sides of the split therein, both set inwardly, for the purpose specified.

2. In combination with a collet having a tapered bore to receive a split tapered tubular saw and a longitudinal parallel sided slot in the bore; of a reversible key having a parallel sided base to engage the slot in the collet, and a projecting rib tapered at its end so that it can be entered into the split in the saw to expand it in the collet when the key is entered into the slot.

3. In combination a collet having a tapered bore to receive a split tapered tubular saw, and a longitudinal slot in the bore; and a reversible key having a base fitted in this slot and a projecting rib tapered at each end so that either end can be entered into the split in the saw to expand the saw in the collet when the key is driven into the slot.

4. In a tubular saw cutting machine, a collet having a bore adapted to receive a split tubular saw, and a straight parallel sided keyway in said bore; and a reversible key comprising a base having its sides parallel to fit the parallel sided keyway, and a projecting rib on the base adapted to be interposed between the edges of the split in the saw, said rib having each end tapered so that either may be entered into the split.

5. A key for the purpose specified comprising a body portion of uniform width, and a raised longitudinal rib on one face of the body, said rib having a tapered end and the side edges of its major portion parallel.

6. A key for the purpose specified comprising a body portion of uniform width, and a raised rib on one face of the body having each end tapered and the side edges of the intermediate portion parallel.

7. A reversible key for the purpose specified comprising a base adapted to engage a slot in a saw holding collet, and a longitudinal raised rib on one face of the base having each end tapered so that either end may be entered into a saw in the collet, the intermediate portion of the rib having parallel sides.

8. A reversible key for the purpose specified having a straight body portion with parallel sides adapted to fit a straight parallel sided keyway in a saw holding collet, and having a longitudinal rib on the base having each end tapered so that either end may be entered between the meeting edges of a saw in the collet and the portion of the rib intermediate the tapered ends thereof having parallel sides.

9. In combination, a collet having a bore provided with a keyway, a split tubular tool in said bore, and a reversible key having a body portion of uniform width fitting the keyway and having a longitudinal rib adapted to have either end entered between the meeting edges of the tool, said rib portion having each end tapered and its sides intermediate the tapered ends parallel.

10. A tubular button cutting saw having teeth of high speed file-hard steel maintained set by their file hard condition.

11. A saw as set forth in the next preceding claim, having a full inwardly set tooth at each side of the split therein, for the purpose specified.

12. A tubular button cutting saw of high speed file-hard steel with its teeth set and maintained set by the file hard condition as a counterbalancing effect to the distortional stresses set up by the setting operation.

THOMAS F. BARRY.
LEONARD BOWEN.